(12) United States Patent
Lynn et al.

(10) Patent No.: US 8,464,034 B2
(45) Date of Patent: Jun. 11, 2013

(54) CONSOLIDATED BOOT PARAMETER MANAGEMENT SYSTEMS AND METHODS

(75) Inventors: James A. Lynn, Rose Hill, KS (US);
Andrew J. Spry, Wichita, KS (US);
Scott Masterson, Wichita, KS (US)

(73) Assignee: LSI Corporation, Milpitas, CA (US)

( * ) Notice: Subject to any disclaimer, the term of this patent is extended or adjusted under 35 U.S.C. 154(b) by 811 days.

(21) Appl. No.: 12/387,189

(22) Filed: Apr. 29, 2009

(65) Prior Publication Data

US 2010/0281242 A1 Nov. 4, 2010

(51) Int. Cl.
*G06F 15/177* (2006.01)
(52) U.S. Cl.
USPC .................................... 713/1; 713/2; 713/100
(58) Field of Classification Search
USPC ................................................ 713/1, 2, 100
See application file for complete search history.

(56) References Cited

U.S. PATENT DOCUMENTS

| | | | | |
|---|---|---|---|---|
| 4,885,770 A | * | 12/1989 | Croll | 379/269 |
| 5,367,688 A | * | 11/1994 | Croll | 713/2 |
| 5,675,795 A | * | 10/1997 | Rawson et al. | 713/2 |
| 5,842,011 A | * | 11/1998 | Basu | 713/2 |
| 6,954,852 B2 | * | 10/2005 | Burokas et al. | 713/2 |
| 7,747,723 B2 | * | 6/2010 | Ogawa et al. | 709/223 |
| 2003/0200290 A1 | * | 10/2003 | Zimmerman et al. | 709/222 |
| 2003/0208675 A1 | * | 11/2003 | Burokas et al. | 713/1 |
| 2005/0038880 A1 | * | 2/2005 | Danforth | 709/222 |
| 2009/0132720 A1 | * | 5/2009 | Ruppert et al. | 709/231 |

* cited by examiner

*Primary Examiner* — M Elamin
(74) *Attorney, Agent, or Firm* — Suiter Swantz pc llo (57) ABSTRACT

Methods and systems for provision of boot parameters may comprise: receiving one or more boot parameter event notification registration requests; registering one or more boot parameter event receiver clients; and providing one or more boot parameters to one or more registered boot parameter event receiver clients.

18 Claims, 6 Drawing Sheets

CONSOLIDATED BOOT PARAMETER MANAGEMENT SYSTEMS AND METHODS

BACKGROUND

A I/O processing system may include I/O controller chip driver logic (e.g. controller hardware, firmware and/or software). These drivers may interact with a particular I/O chip to perform operations required by the remainder of an I/O processing system. It may be the case that different I/O controller chips may implement driver logic in a number of different manners. One of the issues with such a configuration is how the I/O processing system configures the driver logic during boot operations. Therefore, a need for a boot parameter management system for one or more heterogeneous I/O chip drivers exists.

SUMMARY

Methods and systems for provision of boot parameters may comprise: receiving one or more boot parameter event notification registration requests; registering one or more boot parameter event receiver clients; and providing one or more boot parameters to one or more registered boot parameter event receiver clients.

BRIEF DESCRIPTION OF THE DRAWINGS

The numerous advantages of the disclosure may be better understood by those skilled in the art by reference to the accompanying figures in which FIGURE NUMBER:

1 shows a high-level block diagram of a system for configuring a storage device.
2 is a high-level logic flowchart of a process.
3 is a high-level logic flowchart of a process.
4 is a high-level logic flowchart of a process.
5 is a high-level logic flowchart of a process.
6 is a high-level logic flowchart of a process.

DETAILED DESCRIPTION

During a boot process, I/O processing systems (such as a storage array 110) may require various configuration parameters for integrated I/O components controlled by one or more I/O controller chips 110A. An I/O controller chip 110A may employ driver logic 110 specific to the I/O controller chip 110A. The driver logic 110 may provide configuration functionality for the I/O controller chip 110A so as to enable communication between the I/O controller chip 110A and a host 112.

The driver logic 110 may require various configuration parameters at different points in time in order to facilitate the configuration of the I/O controller chip 110A. For example, early during a boot process, various parameters (e.g. target device IP addresses) may be required in order for target driver logic 110 (e.g. controller hardware, firmware and/or software) of the I/O controller chip 110A to establish connectivity with an external initiators (e.g. host 112). Such early-access parameters may be stored in low-latency, non-volatile storage media (e.g. NVSRAM, FLASH memory, battery-backed-up dynamic RAM and the like) of a first parameter storage client 108A. Later in the boot process, additional parameters may be required to process read/write requests (e.g. available SCSI Logical Unit Identifiers, iSCSI target names, and the like). The larger volume of data required for these parameters may be stored on less-expensive, higher-latency storage media (e.g. hard disk drives (HDD)) of a second parameter storage client 108B.

It may be the case that driver logic 110A and driver logic 110B may be heterogeneous in nature (e.g. requiring different configuration parameters) though implemented in common systems (e.g. a storage array 110). For example, I/O controller chip 110A-1 and/or I/O controller chip 110A-2 may employ one or more of iSCSI I/O protocols, Fibre Channel I/O protocols, and SAS I/O protocols.

As such, it may be desirable to provide a registration-based parameter management system in order to provide parameters to one or more heterogeneous clients (e.g. a Fiber Channel client, an iSCSI client, an SAS client, and the like).

Figure 1:
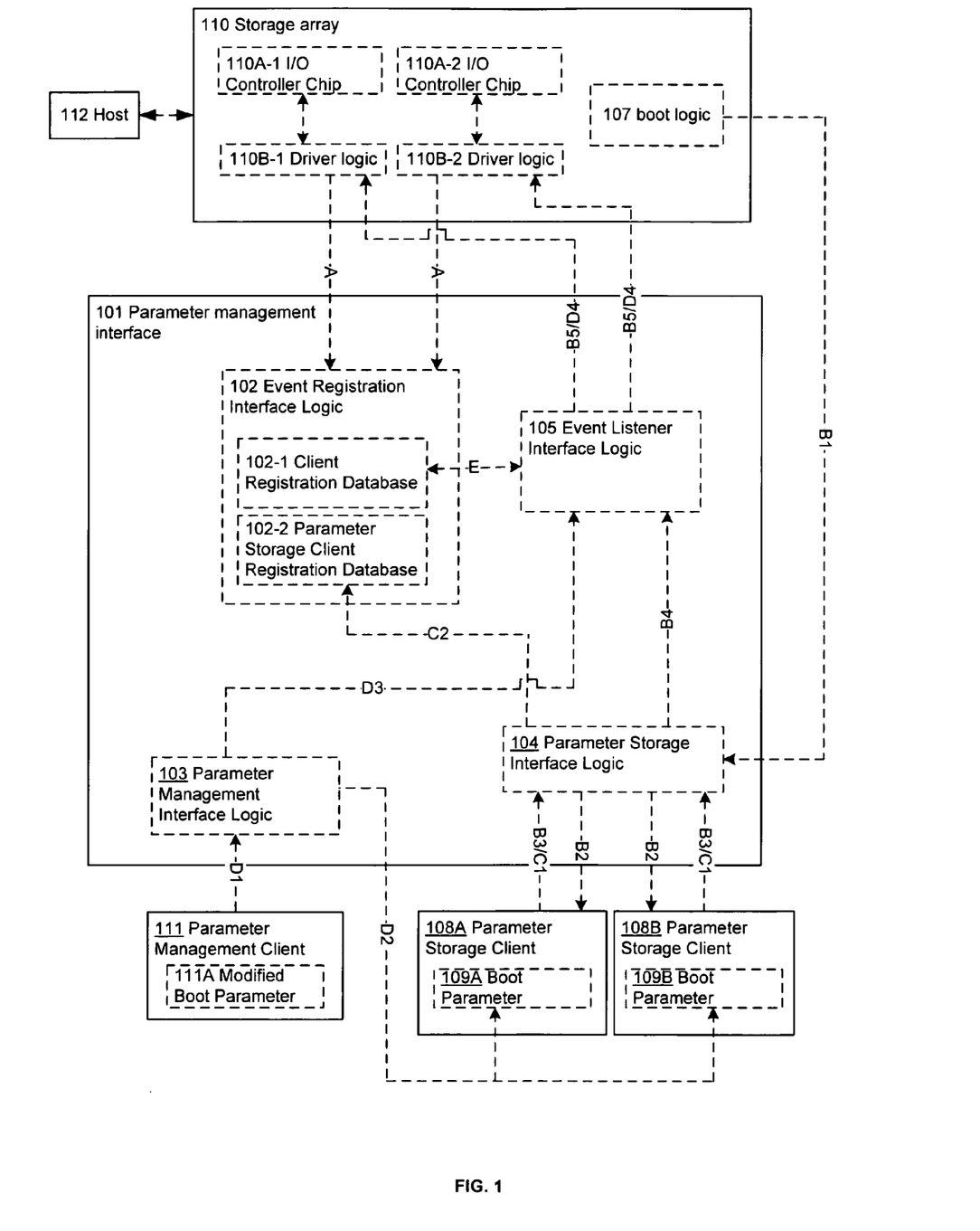

The parameter management interface 101 may include one or more interfaces (e.g. event registration interface logic 102) with which one or more clients (e.g. driver logic 110A and/or driver logic 110B) may register as a member of a parameter notification group associated a given parameter. Registration with a parameter notification group allows clients to receive system configuration events (e.g. broadcasts of various boot parameters maintained in one or more parameter storage clients 109) for a desired parameter.

The parameter management interface 101 may be responsible for reading parameters from a parameter storage client 108 and providing the configuration parameter data to the driver logic 110 as each parameter is read. The parameter management interface 101 may relay the configuration data to driver logic 110 that has been registered as a member of a particular parameter's notification group.

Following are descriptions relating to a series of flowcharts depicting various exemplary implementations. For ease of understanding, the flowcharts are organized such that the initial flowcharts present implementations via an example implementation and thereafter the following flowcharts present alternate implementations and/or expansions of the initial flowchart(s) as either sub-component operations or additional component operations building on one or more earlier-presented flowcharts. Those having skill in the art will appreciate that the style of presentation utilized herein (e.g., beginning with a presentation of a flowchart(s) presenting an example implementation and thereafter providing additions to and/or further details in subsequent flowcharts) generally allows for a rapid and easy understanding of the various process implementations. In addition, those skilled in the art will further appreciate that the style of presentation used herein also lends itself well to modular and/or object-oriented program design paradigms.

Figure 2:
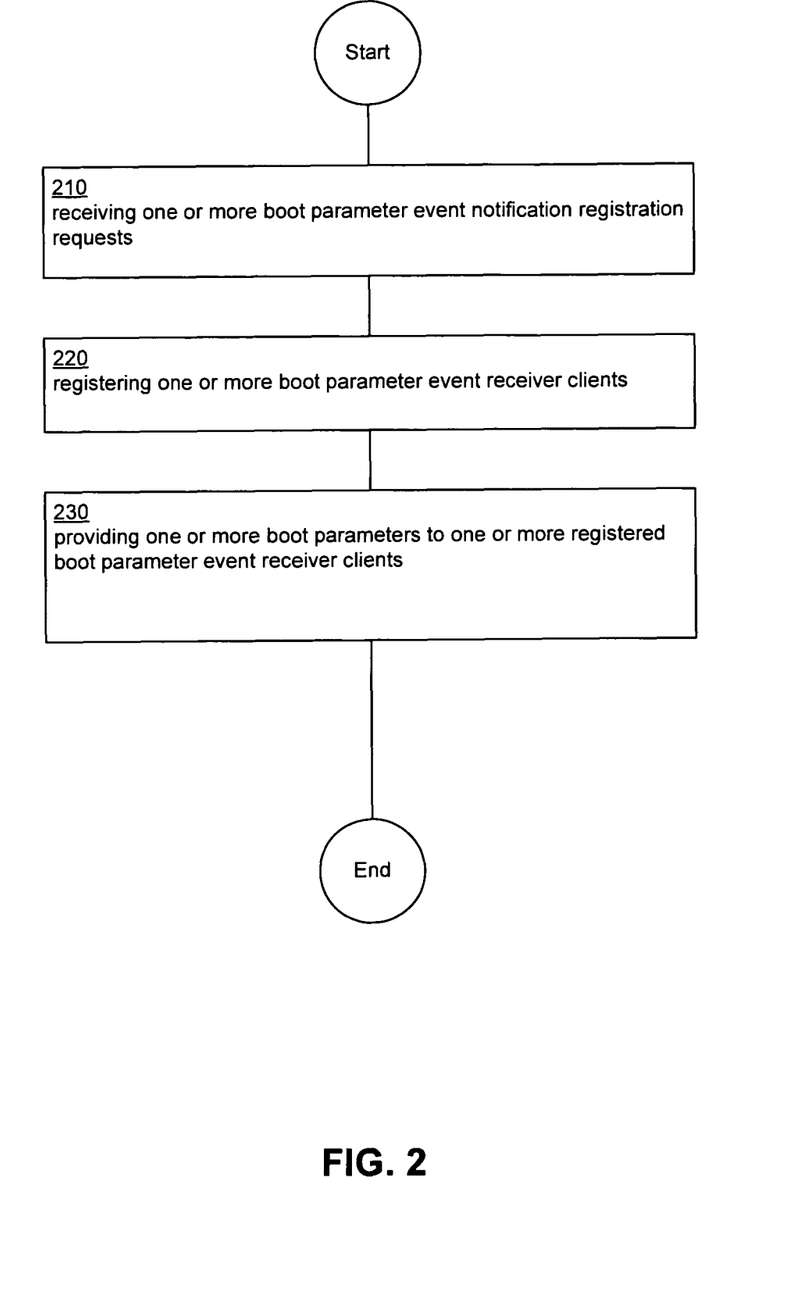

FIG. 2 illustrates an operational flow 200 representing example operations related to configuring a storage network. In FIG. 2 and in following figures that include various examples of operational flows, discussion and explanation may be provided with respect to the above-described examples of FIG. 1, and/or with respect to other examples and contexts. However, it should be understood that the operational flows may be executed in a number of other environments and contexts, and/or in modified versions of FIG. 1. Also, although the various operational flows are presented in the sequence(s) illustrated, it should be understood that the various operations may be performed in other orders than those that are illustrated, or may be performed concurrently.

After a start operation, the operational flow 200 moves to an operation 210. Operation 210 depicts receiving one or more boot parameter event notification registration requests. For example, as shown in FIG. 1, driver logic 110A and/or driver logic 110B may provide a boot parameter event notification registration request to event registration interface logic 102 via path A whereby the driver logic 110A and/or driver logic 110B request to be notified when a boot parameter is made available by the parameter management interface 101 and then provided with the boot parameter.

Figure 3:
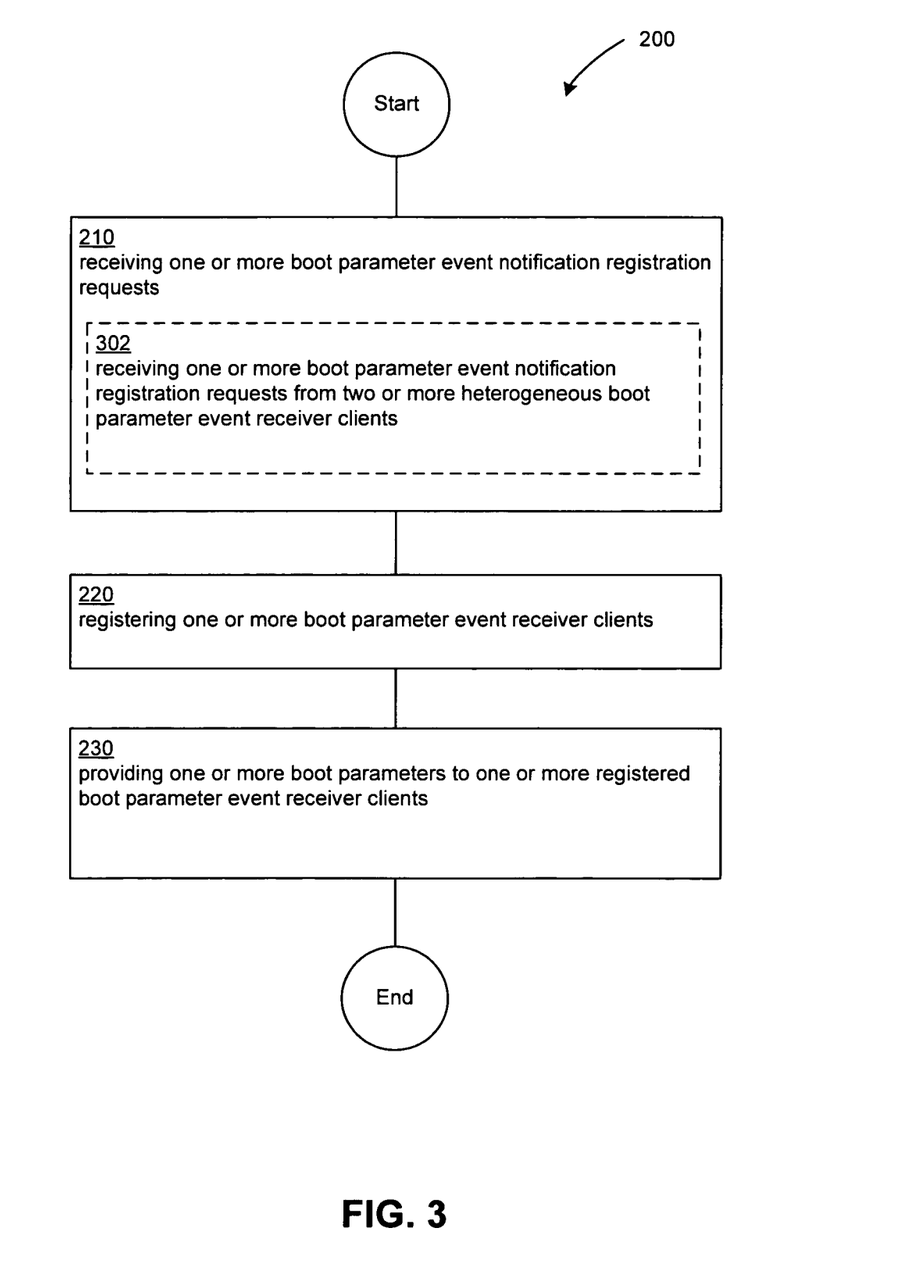

Referring to FIG. 3, the operation 210 may further include an operation 302. Operation 302 depicts receiving one or more boot parameter event notification registration requests from two or more heterogeneous boot parameter event receiver clients. For example, as shown in FIG. 1, the parameter management interface 101 may be generic to one or more types of parameter notification requests (e.g. Fibre Channel World-Wide Node Names, iSCSI TCP/IP addresses, SAS Phy assignments, and the like) so as to allow interfacing with the heterogeneous driver logic 110 (e.g. where driver logic 110A employs Fiber Channel protocols while driver logic 110B employs iSCSI protocols, SAS protocols, and the like).

Referring again to FIG. 2, operation 220 depicts registering one or more boot parameter event receiver clients. For example, as shown in FIG. 1, the event registration interface logic 102 may process the boot parameter event notification registration request and register driver logic 110A and/or driver logic 110B as members of a notification group for a particular boot parameter for which driver logic 110A and/or driver logic 110B are requesting membership. This membership data may be maintained by the event registration interface logic 102 as a client registration database 102-1.

Operation 230 depicts providing one or more boot parameters to one or more registered boot parameter event receiver clients. For example, as shown in FIG. 1, during a boot process, boot logic 107 of a storage array 110 may transmit a request to parameter storage interface logic 104 of the parameter management interface 101 requesting that the parameter management interface 101 provide driver logic 110 with one or more boot parameters 109 from one or more heterogeneous parameter storage clients 108 via path B1. The parameter storage interface logic 104 may query a parameter storage client 108 (e.g. a NVSRAM parameter storage client 108A and/or a HDD parameter storage client 108B) via path B2. The boot parameter 109 may be provided to the parameter storage interface logic 104 from the parameter storage client 108 via path B3. Upon retrieval of a boot parameter from a parameter storage client 108, the boot parameter may be provided to event listener interface logic 104 via path B4. The event listener interface logic 104 may compare identification data of the subject boot parameter 109 (e.g. parameter header fields, and the like) via path E so as to determine whether driver logic 110A and/or driver logic 110B are registered members of an notification group associated with the boot parameter 109. Upon verification that driver logic 110A and/ or driver logic 110B are members of a notification group associated with the subject boot parameter, the event listener interface logic 104 may route the boot parameter 109 to the driver logic 110A and/or driver logic 110B via path B5.

Figure 4:
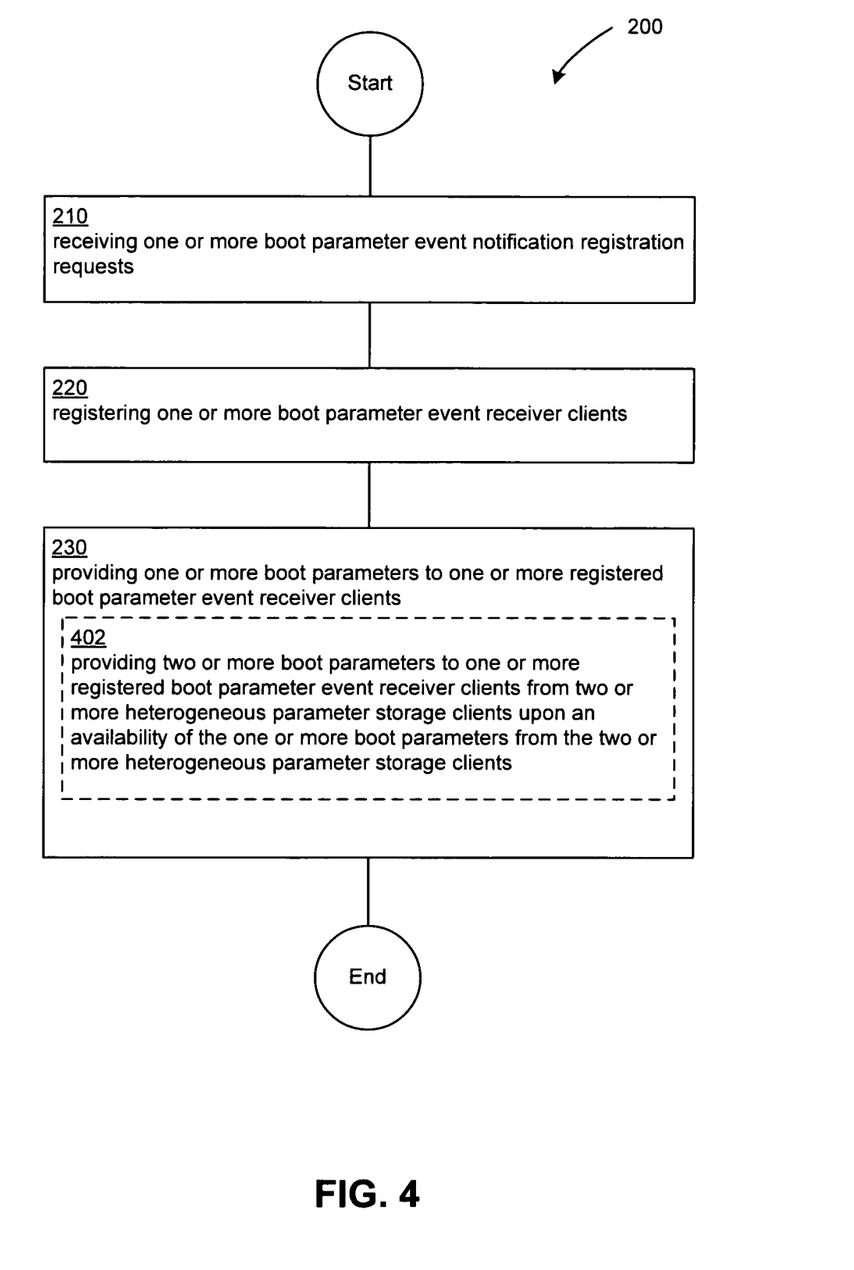

Referring to FIG. 4, the operation 230 of FIG. 2 may further include an operation 402. Operation 402 depicts providing two or more boot parameters to one or more registered boot parameter event receiver clients from two or more heterogeneous parameter storage clients upon an availability of the one or more boot parameters from the two or more heterogeneous parameter storage clients. For example, as shown in FIG. 1, the boot parameter 109 may be provided to the driver logic 110 by the parameter management interface 101 as soon as the data is made available by the parameter storage client 108. In such a configuration, boot parameter 109A data stored on an low-latency parameter storage client 108 (e.g. NVS-RAM) may be provided early in the boot process while boot parameter 109B stored on a higher-latency parameter storage client 108 (e.g. a HDD) may be provided later in the boot process.

Figure 5:
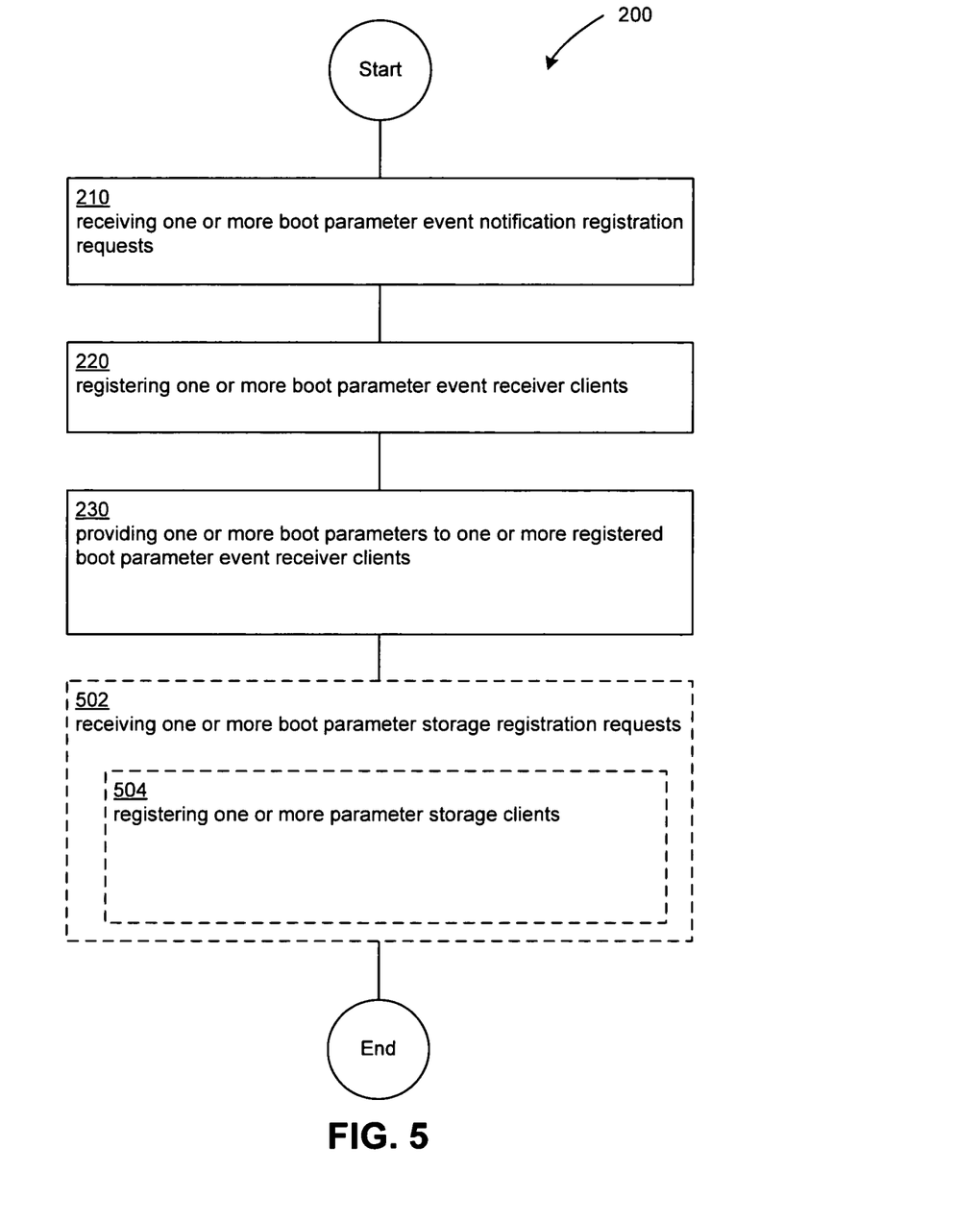

FIG. 5 illustrates alternative embodiments of the example operational flow 200 of FIG. 2. FIG. 5 illustrates example embodiments where the operational flow 200 may include at least one additional operation. Additional operations may include an operation 502 and/or an operation 504.

Operation 502 depicts receiving one or more boot parameter storage registration requests. For example, as shown in FIG. 1, the parameter storage client 108A and/or the parameter storage client 108B may provide a boot parameter storage registration request to a parameter storage interface logic 104 via path C1 whereby the parameter storage client 108A and/ or the parameter storage client 108A notify parameter storage interface logic 104 of the nature of the parameter storage client 108 (e.g. drive type) and/or the types of parameters maintained by the parameter storage client 108.

Operation 504 depicts registering one or more parameter storage clients. For example, as shown in FIG. 1, the parameter storage interface logic 104 may provide the boot parameter storage registration request to event registration interface logic 102 via path C2. The event registration interface logic 102 may register parameter storage client 108A and/or the parameter storage client 108B as available boot parameter storage clients which may provide boot parameters to event listener interface logic 104. This registration status may be maintained by the event registration interface logic 102 as a parameter storage client registration database 102-2.

Figure 6:
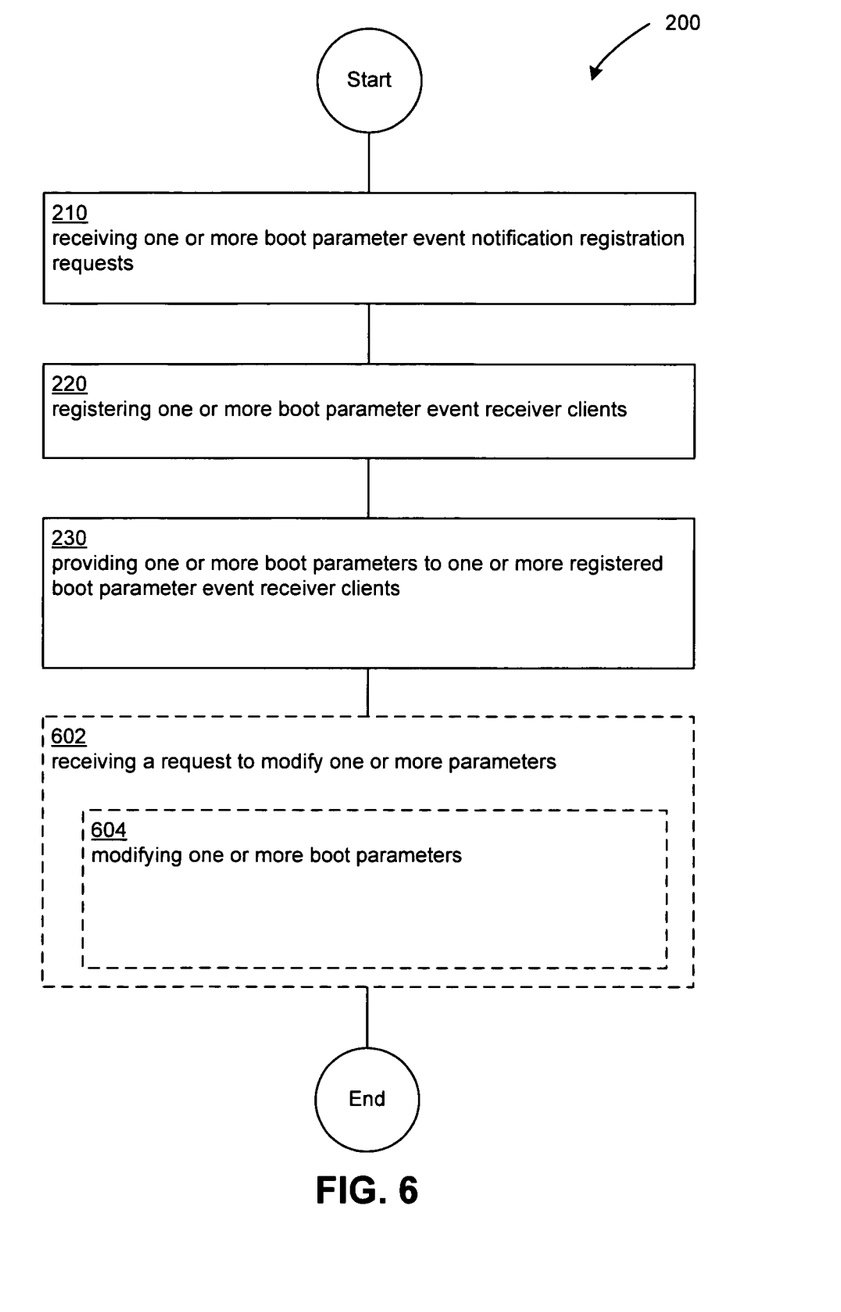

FIG. 6 illustrates alternative embodiments of the example operational flow 200 of FIG. 2. FIG. 6 illustrates example embodiments where the operational flow 200 may include at least one additional operation. Additional operations may include an operation 602, and/or an operation 604.

Operation 602 depicts receiving one or more requests to modify one or more boot parameters. For example, as shown in FIG. 1, a parameter management client 111 may provide a parameter modification request to a parameter management interface logic 103 via path D1 whereby the parameter management client 111 may notify the parameter management interface logic 103 of the nature of a modification (e.g. an addition, deletion, alteration, and the like) of a modified boot parameter 111A. Though the parameter management client 111 is shown in a remote relationship with respect to the storage array 110 in FIG. 1, it will be recognized by one of skill in the art that the parameter management client 111 may be configured as an integrated component of the storage array 110 without departing from the scope of the present descriptions.

Operation 604 depicts modifying one or more boot parameters. For example, as shown in FIG. 1, the parameter management interface logic 103 may provide a modified boot parameter 111A to a parameter storage client 108 via path D2 which may be stored as a boot parameter 109 in the parameter storage client 108. Alternatively, the parameter management interface logic 103 may provide a modified boot parameter 111A to the event listener interface logic 104 via path D3. Upon reception of a modified boot parameter 111A from parameter management interface logic 103, the event listener interface logic 104 may compare identification data of the subject modified boot parameter 111A (e.g. parameter header fields, and the like) via path E so as to determine whether driver logic 110A and/or driver logic 110B are registered members of an notification group associated with the modified boot parameter 109. Upon verification that driver logic 110A and/or driver logic 110B are members of a notification group associated with the subject boot parameter, the event listener interface logic 104 may route the modified boot parameter 111A to the driver logic 110A and/or driver logic 110B via path D4.

Those having skill in the art will recognize that the state of the art has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

In some implementations described herein, logic and similar implementations may include software or other control structures. Electronic circuitry, for example, may have one or more paths of electrical current constructed and arranged to implement various functions as described herein. In some implementations, one or more media may be configured to bear a device-detectable implementation when such media hold or transmit a device detectable instructions operable to perform as described herein. In some variants, for example, implementations may include an update or modification of existing software or firmware, or of gate arrays or programmable hardware, such as by performing a reception of or a transmission of one or more instructions in relation to one or more operations described herein. Alternatively or additionally, in some variants, an implementation may include special-purpose hardware, software, firmware components, and/or general-purpose components executing or otherwise invoking special-purpose components. Specifications or other implementations may be transmitted by one or more instances of tangible transmission media as described herein, optionally by packet transmission or otherwise by passing through distributed media at various times.

Alternatively or additionally, implementations may include executing a special-purpose instruction sequence or invoking circuitry for enabling, triggering, coordinating, requesting, or otherwise causing one or more occurrences of virtually any functional operations described herein. In some variants, operational or other logical descriptions herein may be expressed as source code and compiled or otherwise invoked as an executable instruction sequence. In some contexts, for example, implementations may be provided, in whole or in part, by source code, such as C++, or other code sequences. In other implementations, source or other code implementation, using commercially available and/or techniques in the art, may be compiled/implemented/translated/ converted into high-level descriptor languages (e.g., initially implementing described technologies in C or C++ programming language and thereafter converting the programming language implementation into a logic-synthesizable language implementation, a hardware description language implementation, a hardware design simulation implementation, and/or other such similar mode(s) of expression). For example, some or all of a logical expression (e.g., computer programming language implementation) may be manifested as a Verilog-type hardware description (e.g., via Hardware Description Language (HDL) and/or Very High Speed Integrated Circuit Hardware Descriptor Language (VHDL)) or other circuitry model which may then be used to create a physical implementation having hardware (e.g., an Application Specific Integrated Circuit). Those skilled in the art will recognize how to obtain, configure, and optimize suitable transmission or computational elements, material supplies, actuators, or other structures in light of these teachings.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, transceiver, transmission logic, reception logic, etc.).

In a general sense, those skilled in the art will recognize that the various aspects described herein which can be implemented, individually and/or collectively, by a wide range of hardware, software, firmware, and/or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), and/or electrical circuitry forming a communications device (e.g., a modem, communications switch, optical-electrical equipment, etc.). Those having skill in the art will recognize that the subject matter described herein may be implemented in an analog or digital fashion or some combination thereof.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

In some instances, one or more components may be referred to herein as "configured to," "configured by," "configurable to," "operable/operative to," "adapted/adaptable," "able to," "conformable/conformed to," etc. Those skilled in the art will recognize that such terms (e.g. "configured to") can generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim 1ncludes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those that are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to" or other past-tense adjectives are generally not intended to exclude such variants, unless context dictates otherwise.

Although specific dependencies have been identified in the claims, it is to be noted that all possible combinations of the features of the claims are envisaged in the present application, and therefore the claims are to be interpreted to include all possible multiple dependencies.

What is claimed is:

1. A method comprising:
   receiving one or more boot parameter event notification registration requests;
   registering one or more boot parameter event receiver clients; and
   providing two or more boot parameters to one or more registered boot parameter event receiver clients from two or more heterogeneous parameter storage clients upon an availability of the one or more boot parameters from the two or more heterogeneous parameter storage clients.

2. The method of claim 1, wherein the receiving one or more boot parameter event notification registration requests further comprises:
   receiving one or more boot parameter event notification registration requests from two or more heterogeneous boot parameter event receiver clients.

3. The method of claim 1, further comprising:
   receiving one or more boot parameter storage registration requests.

4. The method of claim 3, further comprising:
   registering one or more parameter storage clients.

5. The method of claim 1, further comprising:
   receiving one or more requests to modify one or more boot parameters.

6. The method of claim 5, further comprising:
   modifying one or more boot parameters.

7. A system comprising:
   means for receiving one or more boot parameter event notification registration requests;
   means for registering one or more boot parameter event receiver clients; and
   means for providing two or more boot parameters to one or more registered boot parameter event receiver clients from two or more heterogeneous parameter storage clients upon an availability of the one or more boot parameters from the two or more heterogeneous parameter storage clients.

8. The system of claim 7, wherein the means for receiving one or more boot parameter event notification registration requests further comprises:
   means for receiving one or more boot parameter event notification registration requests from two or more heterogeneous boot parameter event receiver clients.

9. The system of claim 7, further comprising:
   means for receiving one or more boot parameter storage registration requests.

10. The system of claim 9, further comprising:
    means for registering one or more parameter storage clients.

11. The system of claim 7, further comprising:
    means for receiving one or more requests to modify one or more boot parameters.

12. The system of claim 11, further comprising:
    means for modifying one or more boot parameters.

13. A non-transitory computer-readable storage medium comprising computer readable instructions which, when executed on a processor, cause the processor to execute a process, the process comprising:
    receiving one or more boot parameter event notification registration requests;
    registering one or more boot parameter event receiver clients; and
    providing two or more boot parameters to one or more registered boot parameter event receiver clients from two or more heterogeneous parameter storage clients upon an availability of the one or more boot parameters from the two or more heterogeneous parameter storage clients.

14. The non-transitory computer-readable storage medium of claim 13, wherein the receiving one or more boot parameter event notification registration requests further comprises:
    receiving one or more boot parameter event notification registration requests from two or more heterogeneous boot parameter event receiver clients.

15. The non-transitory computer-readable storage medium of claim 13, further comprising:
    receiving one or more boot parameter storage registration requests.

16. The non-transitory computer-readable storage medium of claim 15, further comprising:
    registering one or more parameter storage clients.

17. The non-transitory computer-readable storage medium of claim 13, further comprising:
    receiving one or more requests to modify one or more boot parameters.

18. The non-transitory computer-readable storage medium of claim 17, further comprising:
    modifying one or more boot parameters.

* * * * *